United States Patent

Greenberg et al.

[11] Patent Number: 5,642,762
[45] Date of Patent: Jul. 1, 1997

[54] LAUNDRY SOAP DISPENSER

[76] Inventors: Joe David Greenberg; Craig Jamieson Anderson, both of 850 Parker Street, White Rock, B.C., Canada, V4B 4R2

[21] Appl. No.: 553,916

[22] Filed: Nov. 6, 1995

[51] Int. Cl.$^6$ .................................................. B65B 1/00
[52] U.S. Cl. .................. 141/358; 141/354; 141/362; 141/330; 222/226
[58] Field of Search .................................. 141/351, 353, 141/354, 357, 358, 360, 362, 330; 222/226, 227

[56] References Cited

U.S. PATENT DOCUMENTS

| | | | |
|---|---|---|---|
| 245,125 | 8/1881 | Brown | 141/358 X |
| 592,750 | 10/1897 | Day | 141/354 X |
| 2,726,026 | 12/1955 | Gould et al. | 222/227 X |
| 2,903,024 | 9/1959 | Lohse | 141/358 X |
| 4,130,149 | 12/1978 | Hausam | 141/358 |
| 4,166,487 | 9/1979 | Spies | 141/358 |
| 4,232,718 | 11/1980 | Wippermann | 141/358 |
| 4,576,313 | 3/1986 | Smith et al. | 141/330 X |
| 5,086,818 | 2/1992 | Bendt | 141/358 |
| 5,236,022 | 8/1993 | Husted | 141/358 |

*Primary Examiner*—J. Casimer Jacyna

[57] ABSTRACT

A dispenser for supplying a predetermined amount of laundry detergent into a measuring cup. The inventive device includes a container having a dispensing aperture directed through a lower surface thereof. A valve plate is movably mounted within a channel extending along the lower surface of the container and covers the aperture. A measuring cup is positionable into the channel to bias the valve plate from over the aperture to dispense laundry detergent from the container into the cup.

1 Claim, 5 Drawing Sheets

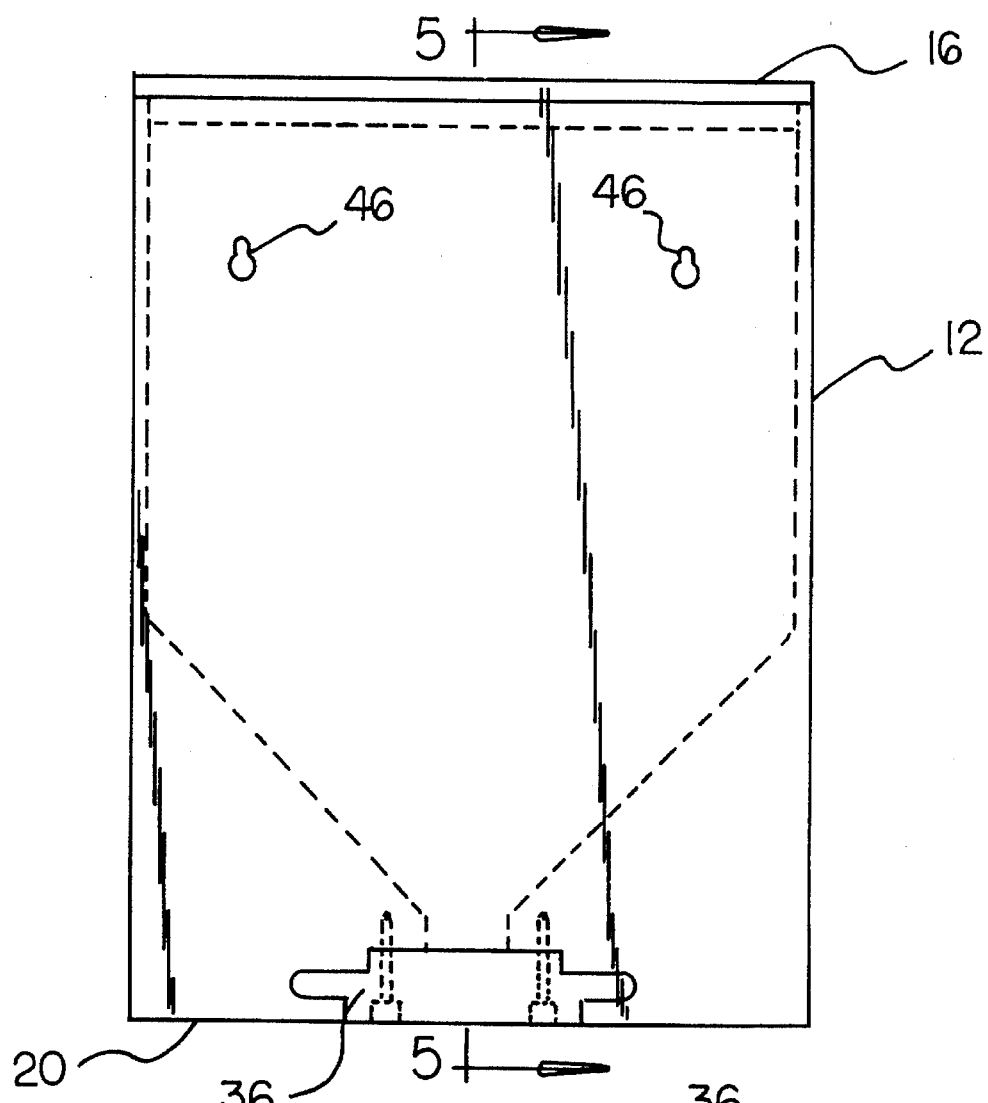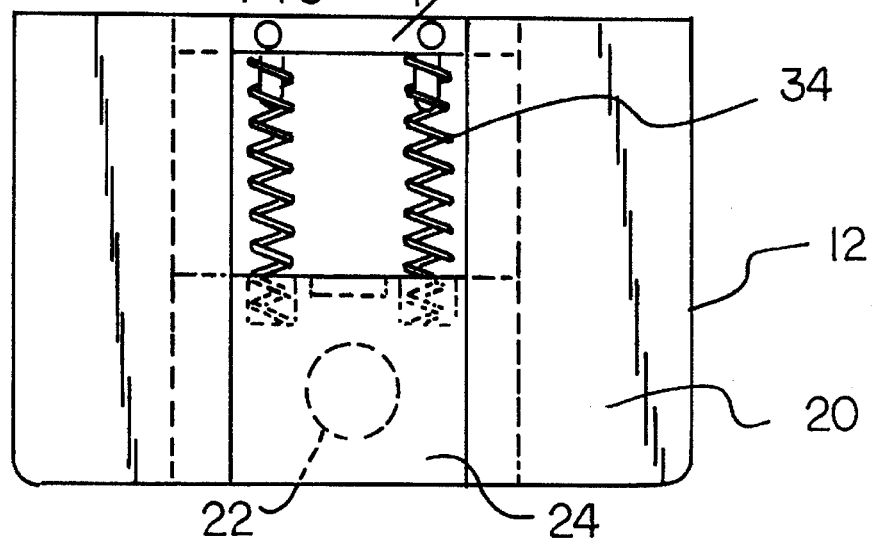

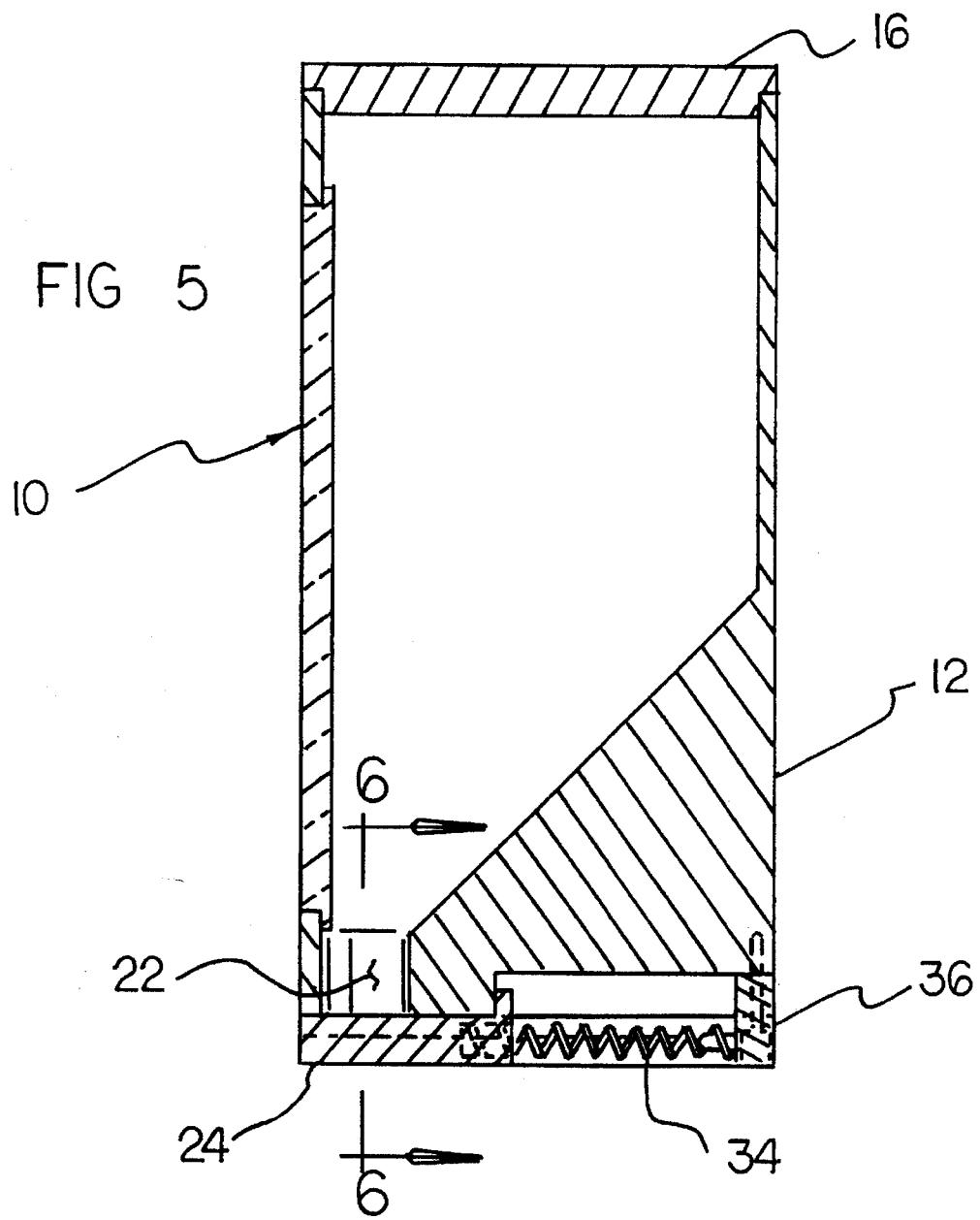
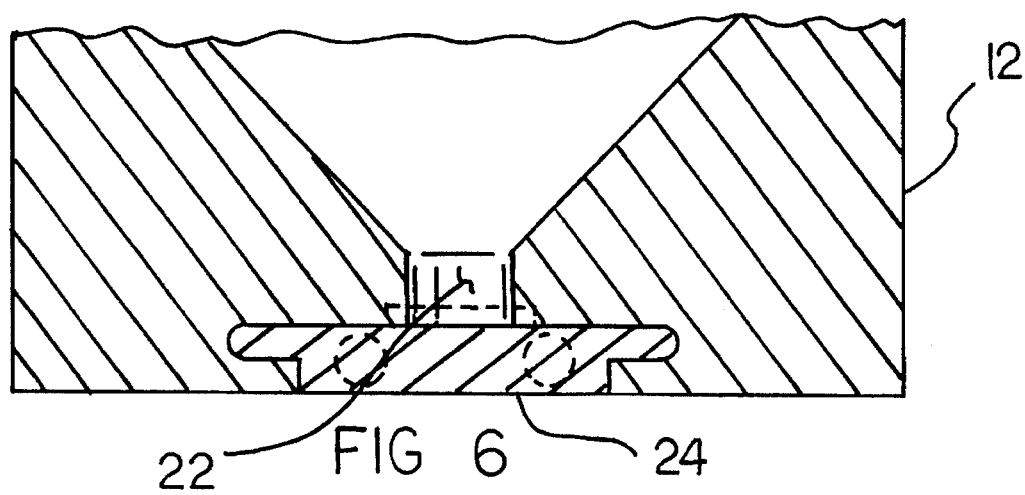

LAUNDRY SOAP DISPENSER

BACKGROUND OF THE INVENTION

1. Field of the Invention

The present invention relates to particulate material dispensers and more particularly pertains to a laundry soap dispenser for supplying a predetermined amount of laundry detergent into a measuring cup.

2. Description of the Prior Art

The use of particulate material dispensers is known in the prior art. More specifically, particulate material dispensers heretofore devised and utilized are known to consist basically of familiar, expected and obvious structural configurations, notwithstanding the myriad of designs encompassed by the crowded prior art which have been developed for the fulfillment of countless objectives and requirements.

Known prior art particulate material dispensers include U.S. Pat. Nos. 4,448,334; 5,332,014; 5,082,148; 4,598,844; U.S. Design Patent 341,974; and U.S. Design Patent 327,429.

While these devices fulfill their respective, particular objectives and requirements, the aforementioned patents do not disclose a laundry soap dispenser for supplying predetermined amount of laundry detergent into a measuring cup which includes a container having a dispensing aperture directed through a lower surface thereof, a valve plate movably mounted within a channel extending along the lower surface of the container and covering the aperture, and a measuring cup positionable into the channel to bias the valve plate from over the aperture to dispense laundry detergent from the container into the cup.

In these respects, the laundry soap dispenser according to the present invention substantially departs from the conventional concepts and designs of the prior art, and in so doing provides an apparatus primarily developed for the purpose of supplying a predetermined amount of laundry detergent into a measuring cup.

SUMMARY OF THE INVENTION

In view of the foregoing disadvantages inherent in the known types of particulate material dispensers now present in the prior art, the present invention provides a new laundry soap dispenser construction wherein the same can be utilized for supplying a predetermined amount of laundry detergent into a measuring cup. As such, the general purpose of the present invention, which will be described subsequently in greater detail, is to provide a new laundry soap dispenser apparatus and method which has many of the advantages of the particulate material dispensers mentioned heretofore and many novel features that result in a laundry soap dispenser which is not anticipated, rendered obvious, suggested, or even implied by any of the prior art particulate material dispensers, either alone or in any combination thereof.

To attain this, the present invention generally comprises a dispenser for supplying a predetermined amount of laundry detergent into a measuring cup. The inventive device includes a container having a dispensing aperture directed through a lower surface thereof. A valve plate is movably mounted within a channel extending along the lower surface of the container and covers the aperture. A measuring cup is positionable into the channel to bias the valve plate from over the aperture to dispense laundry detergent from the container into the cup.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new laundry soap dispenser apparatus and method which has many of the advantages of the particulate material dispensers mentioned heretofore and many novel features that result in a laundry soap dispenser which is not anticipated, rendered obvious, suggested, or even implied by any of the prior art tool guides, either alone or in any combination thereof.

It is another object of the present invention to provide a new laundry soap dispenser which may be easily and efficiently manufactured and marketed.

It is a further object of the present invention to provide a new laundry soap dispenser which is of a durable and reliable construction.

An even further object of the present invention is to provide a new laundry soap dispenser which is susceptible of a low cost of manufacture with regard to both materials and labor, and which accordingly is then susceptible of low prices of sale to the consuming public, thereby making such laundry soap dispensers economically available to the buying public.

Still yet another object of the present invention is to provide a new laundry soap dispenser which provides in the apparatuses and methods of the prior art some of the advantages thereof, while simultaneously overcoming some of the disadvantages normally associated therewith.

Still another object of the present invention is to provide a new laundry soap dispenser for supplying a predetermined amount of laundry detergent into a measuring cup.

Yet another object of the present invention is to provide a new laundry soap dispenser which includes a container having a dispensing aperture directed through a lower surface thereof, a valve plate movably mounted within a channel extending along the lower surface of the container and covering the aperture, and a measuring cup positionable into the channel to bias the valve plate from over the aperture to dispense laundry detergent from the container into the cup.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a rear elevation view thereof.

FIG. 4 is a bottom plan view of the invention.

FIG. 5 is a cross sectional view taken along line 5—5 of FIG. 3.

FIG. 6 is a cross sectional view taken along line 6—6 of FIG. 5.

DESCRIPTION OF THE PREFERRED EMBODIMENT

Figure 1:
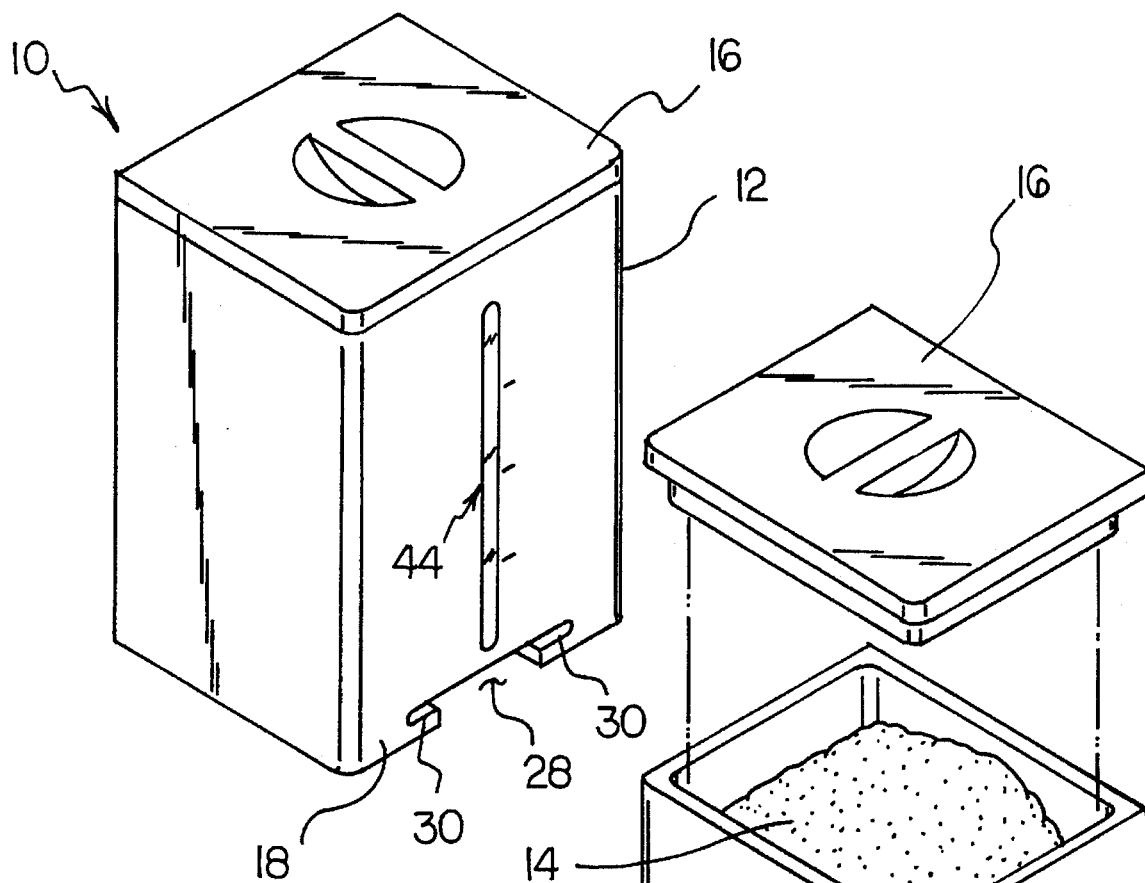
FIG. 1 is an isometric illustration of a laundry soap dispenser according to the present invention.

With reference now to the drawings, and in particular to FIGS. 1–9 thereof, a new laundry soap dispenser embodying the principles and concepts of the present invention and generally designated by the reference numeral 10 will be described.

Figure 2:
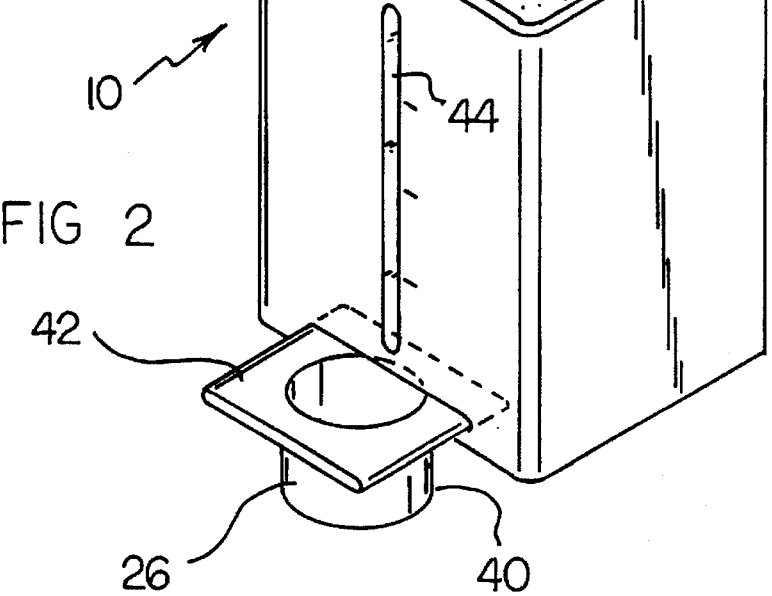
FIG. 2 is an exploded isometric illustration of the invention.
Figure 7:
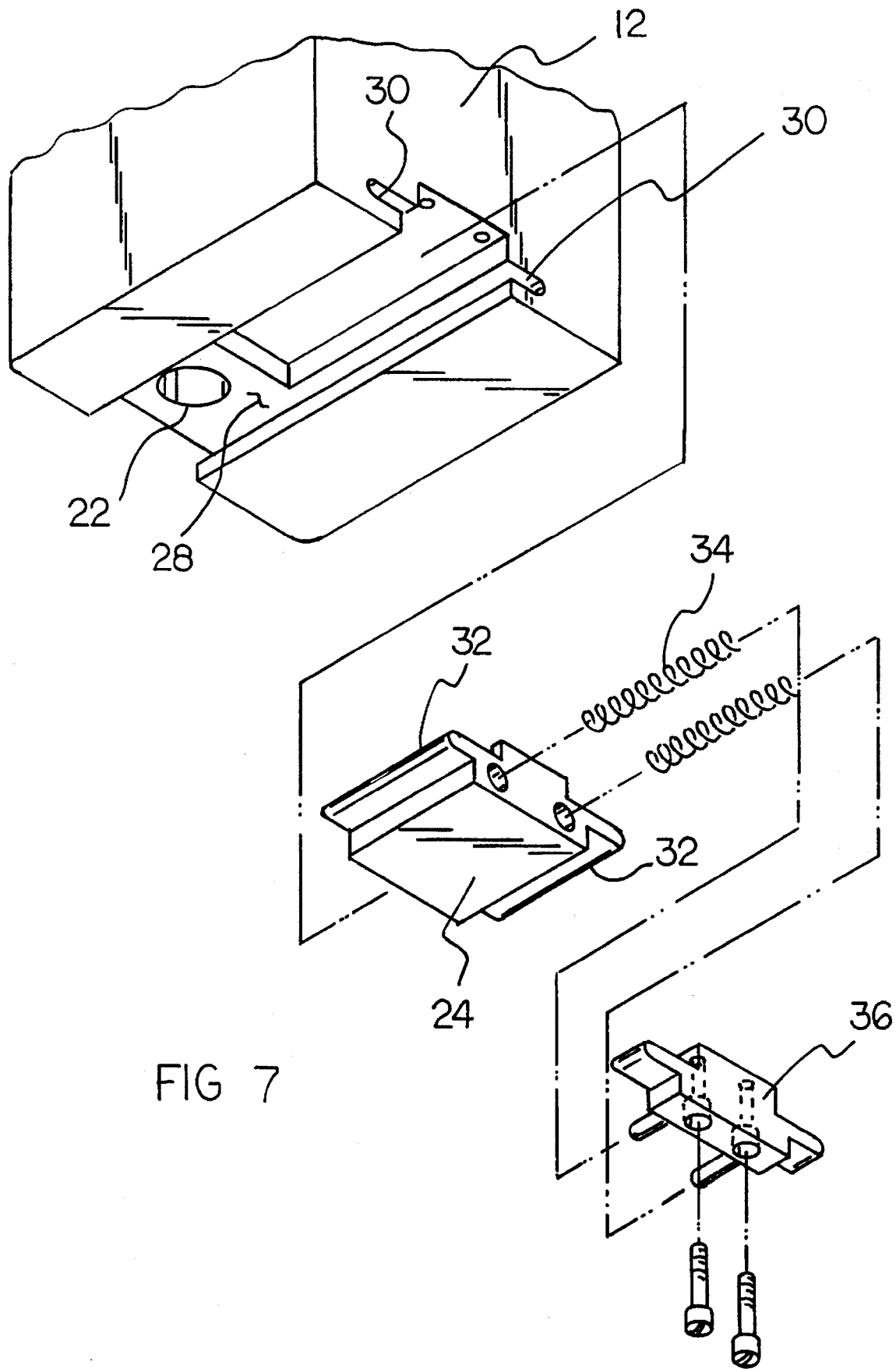
FIG. 7 is an exploded isometric illustration of a portion of the present invention.

More specifically, it will be noted that the laundry soap dispenser 10 comprises a container 12 having a hollow interior within which a particulate detergent 14 can be positioned substantially as shown in FIGS. 1 and 2 of the drawings. A lid 16 is removably coupled to an open upper end of the container 12 and facilitates access to an interior thereof for maintaining the supply of detergent 14 therein. Lid 16 designs may consist of a hinge and may be sealed by O-ring and groove. Storage recesses may be added to lid 16 and lower areas of container 12 where excess plastic exists. The container includes a front wall 18 and a lower surface 20 which are preferably orthogonally oriented substantially as shown in FIGS. 1 and 3 of the drawings. A dispensing aperture 22 is directed through the lower surface 20 of the container 12 and into fluid communication with an interior thereof such that detergent 14 can pass through the dispensing aperture 22 when opened. A valve plate 24 is movably mounted to the lower surface 20 of the container 12 and is normally positioned over the dispensing aperture 22 so as to preclude fluid communication therethrough. A measuring cup 26 can be abuttingly engaged with the valve plate 24 so as to bias the valve plate 24 from over the dispensing aperture 22 to permit laundry detergent 14 to flow from the interior of the container 12 through the dispensing aperture 22 and into the measuring cup 26. By this structure, a predetermined amount of laundry detergent 14 can be dispensed into the measuring cup 26 for subsequent placement into a laundry washer.

Referring now to FIGS. 1 through 7 wherein the present invention 10 is illustrated in detail, it can be shown that the container 12 is preferably shaped so as to define a central channel 28 extending through the front wall 18 thereof and along the lower surface of the container over the dispensing aperture 22. The valve plate 24 is movably mounted within the central channel 28 over the dispensing aperture 22 substantially as shown in FIGS. 4 and 5 of the drawings. To this end, the container 12 is preferably further shaped so as to define a pair of flange channels 30 extending from respectively opposed longitudinal sides of the central channel 28. The valve plate 24 is correspondingly shaped so as to define valve plate flanges 32 projecting from respectively opposed sides thereof which are slidably received within the flange channels 30 of the container 12 so as to movably mount the valve plate 24 over the dispensing aperture 22. To position the valve plate 24 in the normal orientation over the dispensing aperture 22, at least one spring 34 engages the valve plate 24 and is interposed between the valve plate and an abutment plate 36 secured to the container 12 by threaded fasteners or the like directed therethrough. By this structure, the measuring cup 26 can be abuttingly engaged to the valve plate 24 so as to bias the valve plate through the central channel 28 against a force of the spring 34 to uncover the dispensing aperture 22 and allow detergent 14 to flow from an interior of the container 12 through the dispensing aperture and into the measuring cup.

Referring now to specifically to FIG. 2, it can be shown that the measuring cup 26 is preferably shaped so as to define a closed cylindrical container 40 having an open upper end from which a substantially rectangular cup flange 42 orthogonally projects. The cup flange 42 is preferably shaped so as to extend substantially radially outwardly from an exterior surface of the cylindrical container 40 and is aligned with an upper edge thereof such that the cup flange 42 can be slidably positioned within the flange channels 30 to abuttingly engage the valve plate 24 to effect uncovering of the dispensing aperture 22. By this structure, unintentional dispensing of the detergent 14 from the dispensing aperture 22 prior to positioning of the open upper end of the cylindrical container 40 therebeneath as the valve plate 24 is moved to uncover the dispensing aperture is substantially reduced.

With continuing reference to FIGS. 1 and 2, it can be shown that the container 12 desirably includes a viewing window 44 of translucent or transparent construction directed therethrough enabling an individual to visually ascertain a level of detergent 14 within the container. The viewing window 44 may include graduations thereon or printed adjacent thereto.

Figure 8:
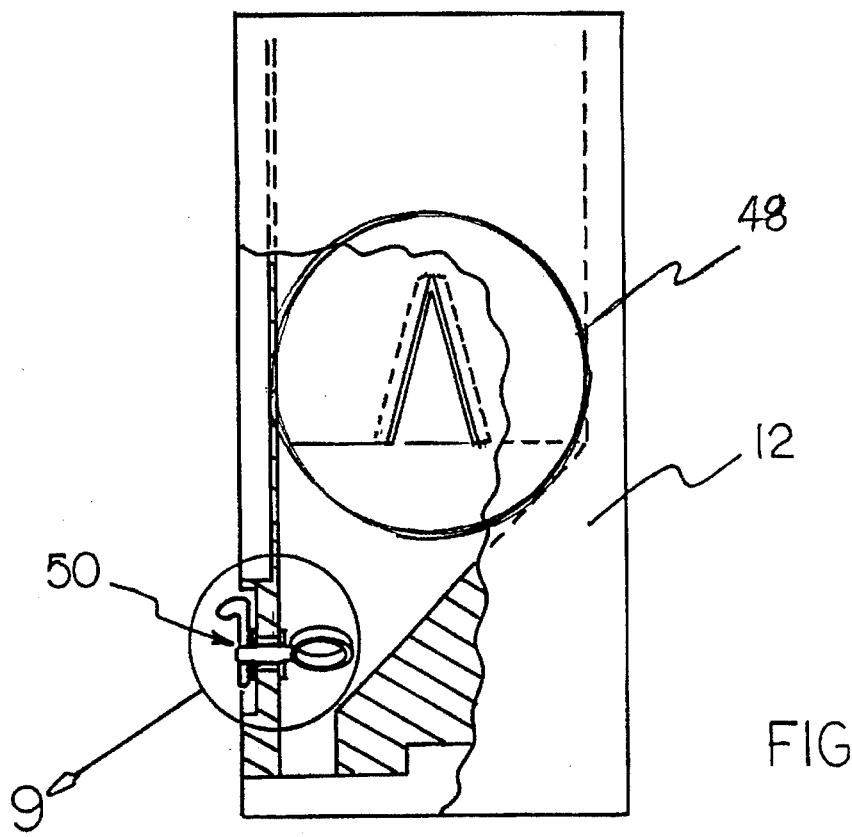
FIG. 8 is a side elevational view, partially in cross section, of the present invention including an agitator assembly.
Figure 9:
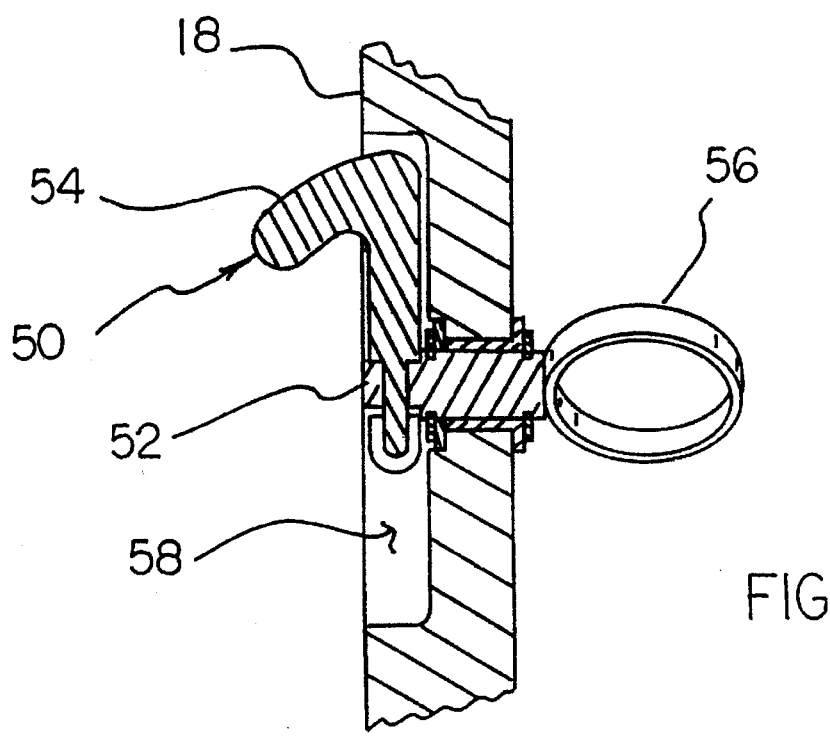
FIG. 9 is an enlarged cross sectional view of the area set forth in FIG. 8 illustrating the agitator assembly.

Referring now to FIGS. 8 and 9, it can be shown that the present invention may additionally include an agitator assembly 50 directed through the front wall 18 of the container 12 and positioned proximal to the aperture 22 thereof so as to agitate and encourage the gravitationally biased dispensing of the material 14 from the container through the aperture. As shown in FIG. 9, the agitator assembly includes an axle 52 rotatably directed through the front wall 18 of the container 12. A crank 54 is mounted to the axle 52 and can be manually rotated to effect concurrent rotation of the axle. An agitator 56, preferably in the form of a hoop, is mounted to an interior portion of the axle 52 within the container 12 and is positioned for contact with material 14 when such material is residing within the container 12. Thus, by a rotation of the crank 54, the agitator 56 will be caused to rotate to break up the material to promote ease of flowing of the material from the container through the aperture 22 thereof. If desired, the container can be shaped so as to define a recess 58 directed into the front wall 18 of the container 12 within which the crank 54 at least partially resides. The crank 54 can further be rotatably coupled to the axle 52 so as to be rotatably positionable completely within the recess 58 of the front wall 18 of the container 12 for storage. To this end, the crank 54 can be rotatably coupled to the axle 52 so as to be rotatable relative to the axle about an axis directed orthogonally through an axis of rotation of the axle.

With reference to FIG. 8, it can be shown that the present invention may additionally include a blade 48 mounted onto or incorporated into the interior walls of the container 12. The inverted V-shaped blade provides a means of piercing and separating bags which contain particulate material. This action allows the filling of container 12 with the bag contents to become an easier, cleaner procedure. The use of biodegradable bags is thereby facilitated which will hopefully lead to a decline in the use of cardboard boxes.

In use, the laundry soap dispenser 10 according to the present invention can be easily utilized for supplying a predetermined amount of laundry detergent into a measuring cup 26. If desired, a variety of disparately sized measuring cups 26 can be provided with the present invention 10 and can include sizes such as a quarter cup, a half cup, three quarters of a cup, and one cup sizes. The present invention can be easily mounted to any desired support surface such as a vertical wall or the like utilizing mounting apertures 46 extending into the container 12 such as is illustrated in FIG. 3 of the drawings. It should be noted that the laundry soap dispenser 10 may be utilized to dispense any type of flowable or particulate materials, including fluid materials if so desired and may include any appropriate sealing means for accomplishing the same.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A laundry soap dispenser comprising:

a container having a hollow interior within which a particulate detergent can be positioned, the container including a front wall and a lower surface, with a dispensing aperture directed through the lower surface of the container and into fluid communication with an interior thereof, the container is shaped so as to define a central channel extending through the front wall thereof and along the lower surface of the container over the dispensing aperture, with a valve plate movably mounted to the lower surface of the container within the central channel and normally positioned over the dispensing aperture so as to preclude fluid communication therethrough, the container is further shaped so as to define a pair of flange channels extending laterally outwardly in opposite directions from respectively opposed longitudinal sides of the central channel, with the valve plate being shaped so as to define valve plate flanges projecting from respectively opposed sides thereof which are slidably received within the flange channels of the container so as to movably mount the valve plate over the dispensing aperture, the container includes a viewing window directed therethrough enabling an individual to visually ascertain a level of detergent within the container when detergent is positioned therein;

a measuring cup adapted to be abuttingly engaged with the valve plate so as to bias the valve plate from over the dispensing aperture to permit fluid communication from the interior of the container through the dispensing aperture and into the measuring cup, the measuring cup is shaped so as to define a closed cylindrical container having an open upper end from which a substantially rectangular cup flange orthogonally projects, the cup flange being shaped so as to extend substantially radially outwardly from an exterior surface of the cylindrical container and being aligned with an upper edge thereof such that the cup flange can be slidably positioned within the flange channels to abuttingly engage the valve plate to effect uncovering of the dispensing aperture;

at least one spring mounted relative to the container and engaging the valve plate so as to position the valve plate over the dispensing aperture;

a lid removably coupled to an open upper end of the container;

an agitator assembly directed through the front wall of the container and positioned proximal to the aperture thereof, the agitator assembly includes an axle rotatably directed through the front wall of the container; a crank mounted to the axle; and an agitator mounted to the axle and within the container, the crank is rotatably coupled to the axle so as to be rotatable relative to the axle about an axis directed orthogonally through an axis of rotation of the axle, the container is shaped so as to define a front wall recess directed into the front wall thereof, with the crank being positioned at least partially within the front wall recess;

an inverted V-shaped blade incorporated into interior walls and being centrally disposed within the container, the blade providing a means of piercing and spreading bags for which particulate material is obtained and emptying contents into dispenser.

* * * * *